Nov. 19, 1935.  C. A. MATHEY ET AL  2,021,632

METHOD OF AND APPARATUS FOR PLACING EXPLOSIVE CHARGES

Filed Jan. 29, 1934  6 Sheets-Sheet 1

INVENTORS
Chester A. Mathey and
Paul F. Lewis
BY
ATTORNEY

Nov. 19, 1935.  C. A. MATHEY ET AL  2,021,632

METHOD OF AND APPARATUS FOR PLACING EXPLOSIVE CHARGES

Filed Jan. 29, 1934   6 Sheets-Sheet 2

INVENTORS
Chester A. Mathey and
Paul F. Lewis
BY
ATTORNEY

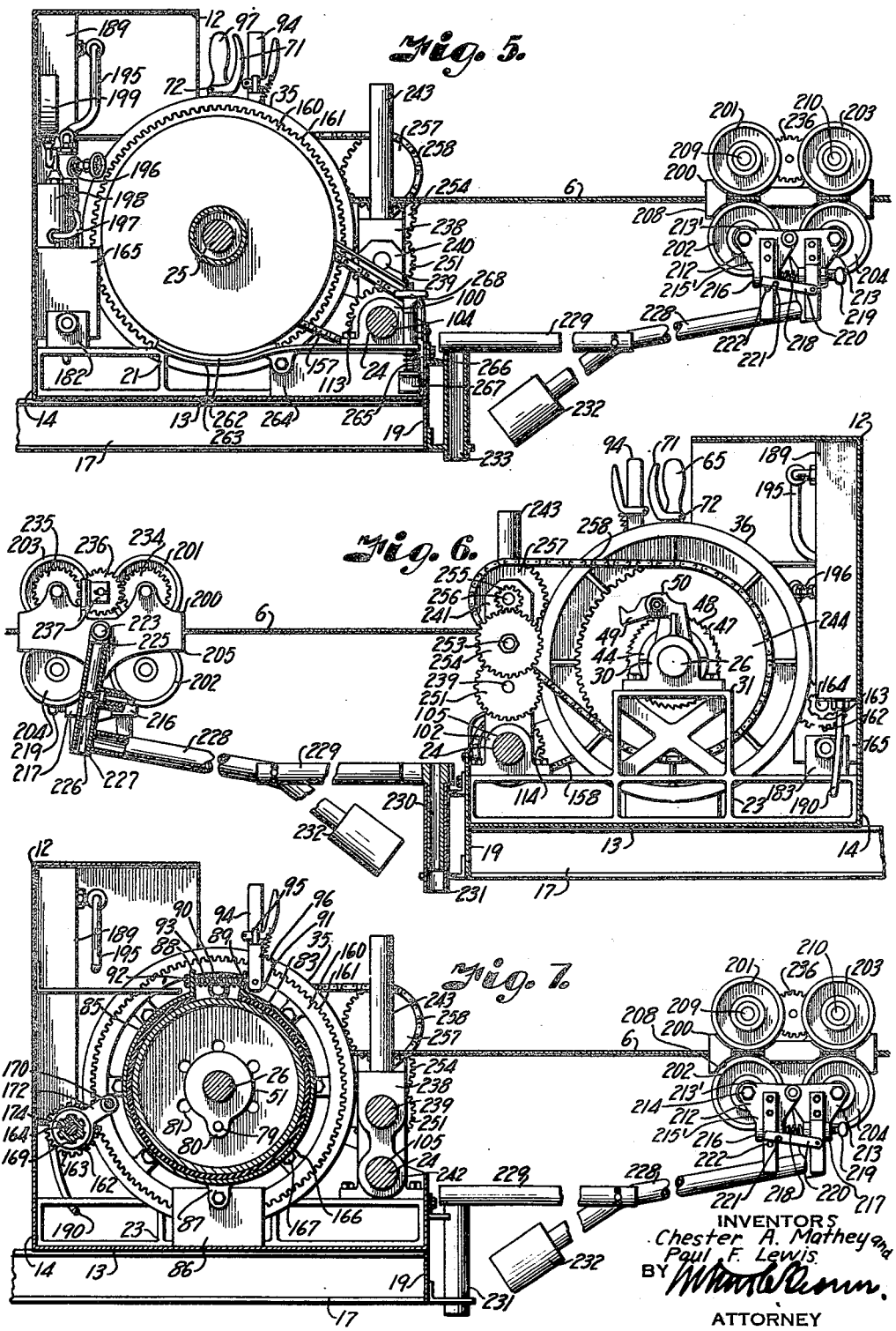

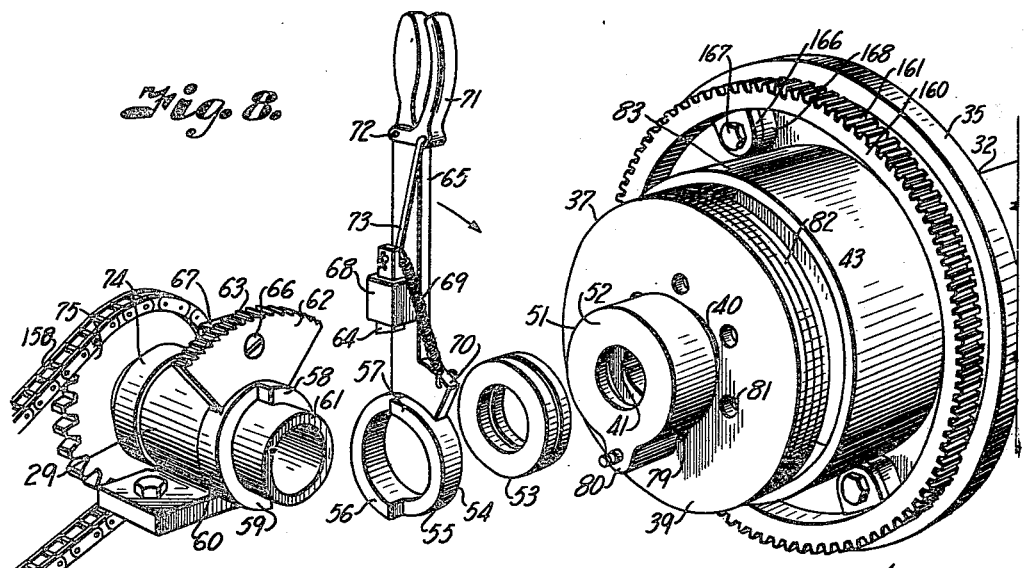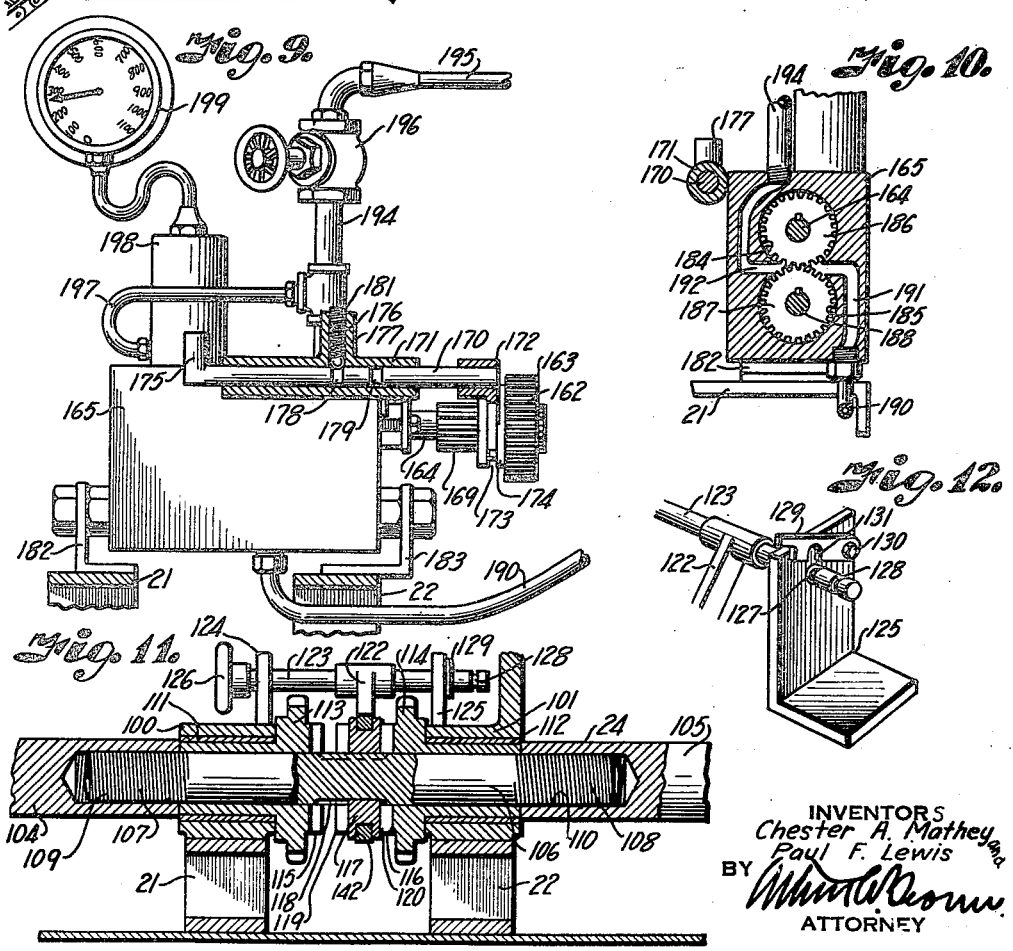

Nov. 19, 1935.  C. A. MATHEY ET AL  2,021,632
METHOD OF AND APPARATUS FOR PLACING EXPLOSIVE CHARGES
Filed Jan. 29, 1934  6 Sheets-Sheet 5
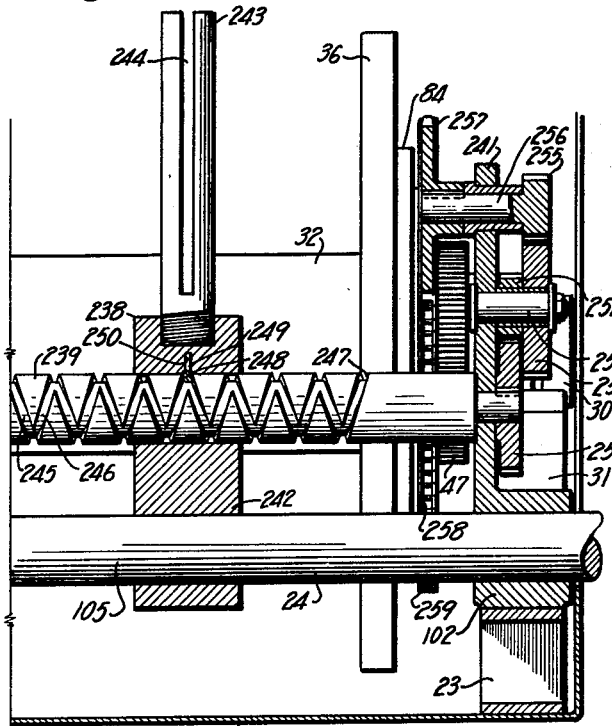
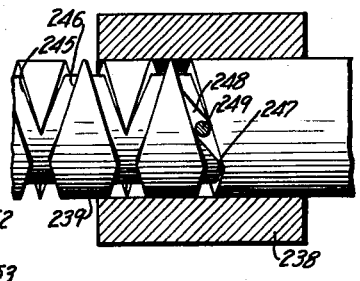
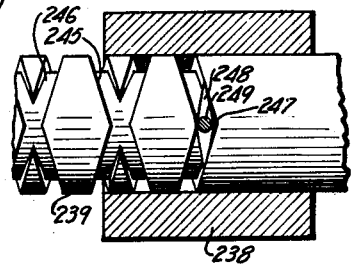
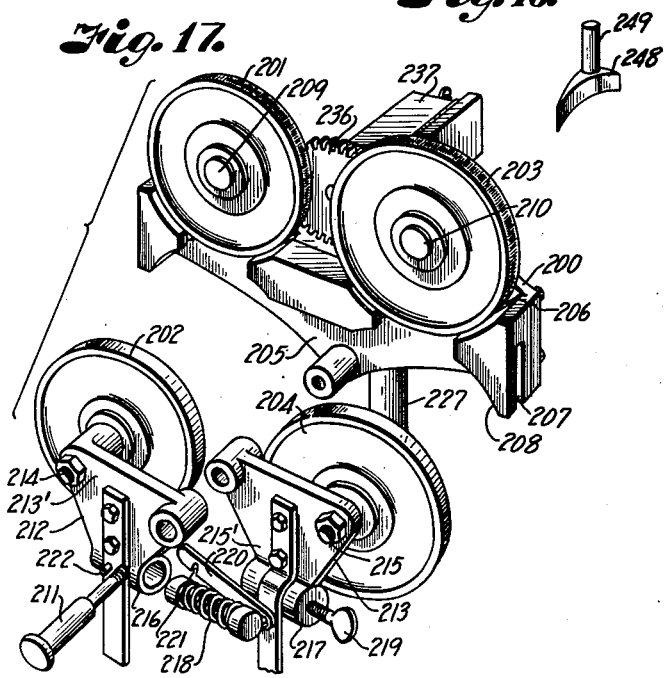
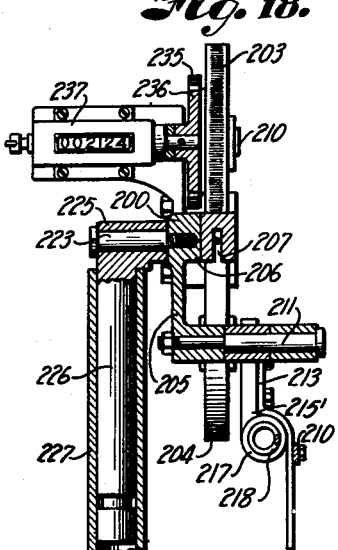
INVENTORS
Chester A. Mathey and
Paul F. Lewis
BY
ATTORNEY

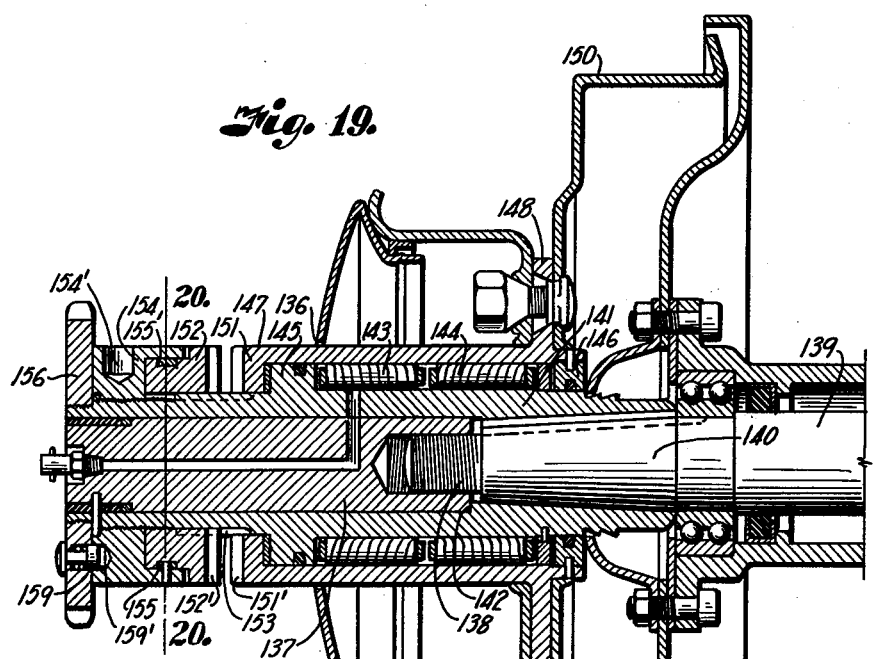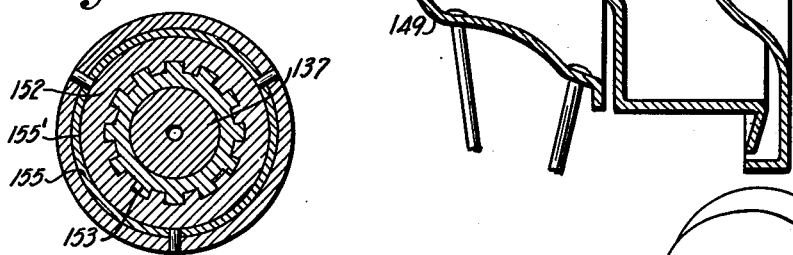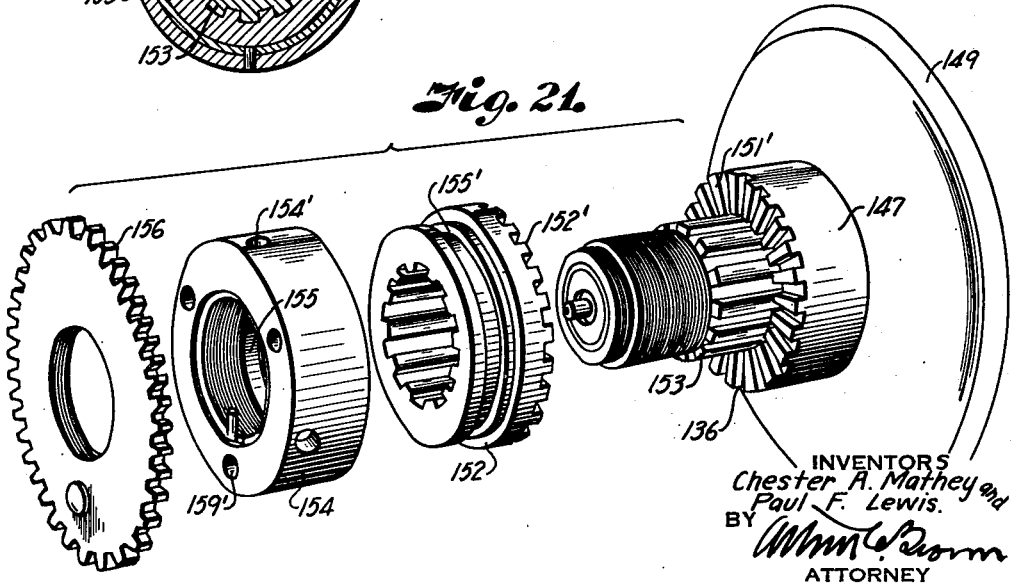

Patented Nov. 19, 1935

2,021,632

UNITED STATES PATENT OFFICE 2,021,632

METHOD OF AND APPARATUS FOR PLACING EXPLOSIVE CHARGES

Chester A. Mathey and Paul F. Lewis, Tulsa, Okla.; said Lewis assignor to American Glycerin Company, Wilmington, Del., a corporation of Delaware Application January 29, 1934, Serial No. 708,839

6 Claims. (Cl. 102—5)

This invention relates to a method of and apparatus for placing explosive charges in oil and other wells to disrupt the producing strata, to sever casing, tubing, drill pipe, etc., for purposes incidental to field practices, and has for its principal object to eliminate many of the hazards common to setting of high explosive charges.

Other important objects of the invention are to indicate the nature and depth of fluids, gases, mechanical equipment, etc., through which the explosive charges are lowered, to positively determine when the explosive charge has reached its point of placement, and to indicate when the explosive charge has been released from the torpedo hook which is attached to the lowering cable.

It is also an important object of the invention to centralize all of the above indications at a common point under direct observation of a single operator who is located at the controls of the reeling equipment, so that the events incidental to descent of the explosive charge are known to the operator to permit control of the reeling equipment in accordance with descent conditions encountered in the well.

Further objects of the invention are to provide reeling, braking and indicating mechanisms as a combined unit which may be readily transported from one well to another and which is serviceable for all of the shooting operations encountered in well shooting practices.

Another important object of the present invention is to provide an improved braking means for positively retarding descent of the explosive charge whereby descent of the charge may be instantly controlled without causing damage to the torpedo shell or the lowering and braking mechanisms.

In accomplishing these and other objects of the invention, we have provided improved details of structure, the preferred form of which is illustrated in the accompanying drawings, wherein:

Fig. 5 is a cross sectional view through the apparatus on the line 5—5, Fig. 3.

Fig. 6 is a cross sectional view on the line 6—6, Fig. 3.

Fig. 7 is a cross sectional view on the line 7—7, Fig. 3.

Fig. 8 is an enlarged detail perspective view of the reel clutch operating members shown in disassembled spaced relation.

Fig. 9 is an elevational view partly in section of the hydraulic mechanism for controlling and indicating descent velocity of the explosive being lowered into the well.

Fig. 10 is a cross sectional view through the hydraulic mechanism on the line 10—10, Fig. 9.

Fig. 11 is a detail sectional view through the clutch for effecting selective actuation of either the squib or torpedo reels.

Fig. 12 is a detail perspective view of the latch mechanism for retaining the clutch shown in Fig. 11 in engagement with either one of its engaging positions.

Fig. 13 is a detail vertical section through the mechanism for effecting layer winding of the cable on the torpedo reel.

Fig. 14 is an enlarged detail view illustrating the follower and one end of the shaft for actuating the cable guide member.

Fig. 15 is a similar view showing the follower in position for being reversed to effect movement of the cable guide member in the opposite direction.

Fig. 16 is a detail perspective view of the follower.

Fig. 17 is a disassembled perspective view of the parts of the measure meter.

Fig. 18 is a central cross sectional view through the measure meter.

Fig. 19 is a detail sectional view through one of the rear wheels and axle of the vehicle particularly illustrating the power take off mechanism for driving the reels.

Fig. 20 is a cross section on the line 20—20, Fig. 19.

Fig. 21 is a perspective view of the clutch parts of the power take off shown in disassembled spaced relation.

Referring more in detail to the drawings:

1 designates a drill hole leading from the earth's surface to an oil or other producing stratum 2, 3 a casing which has been lowered into the drill hole and 4 a derrick forming a part of the equipment employed in drilling operations.

Figure 1:
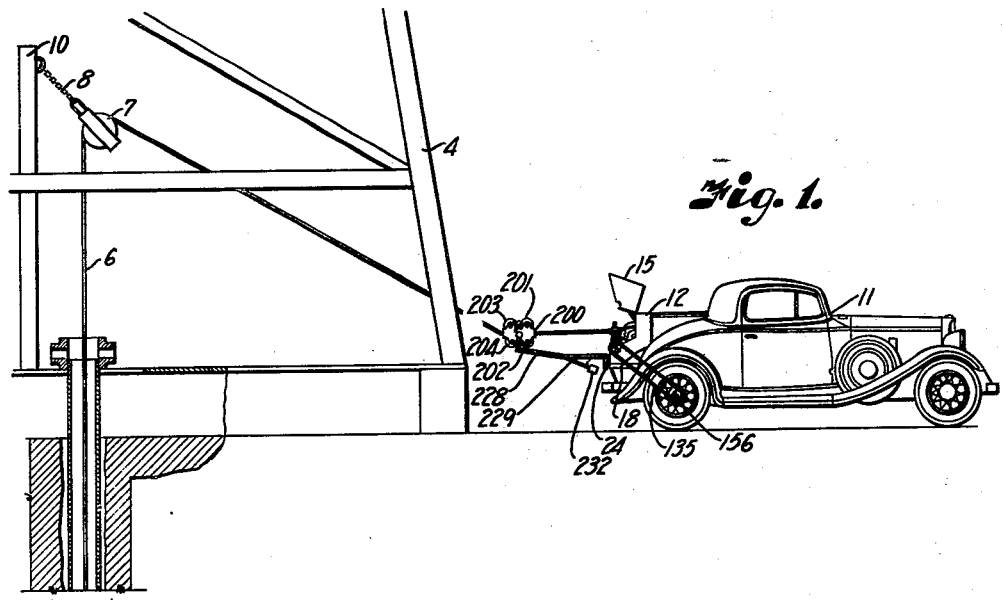
Fig. 1 is a side elevational view of our improved apparatus illustrating the lowering of an explosive charge into an oil well.

Many oil, gas or other productive strata are so hard and compact that the fluid contained therein will not flow into the well hole and it is necessary to shatter the producing strata with explosive charges, for example, heavy charges of nitro-glycerin which are lowered into the well in a series of shells 5 by means of a cable 6 operating over a torpedo pulley 7 at the top of the well. In the illustrated instance, the torpedo pulley 7 is supported over the center of the well by a flexible cable 8 connected to a convenient support 10 on the derrick, as clearly shown in Fig. 1.

In lowering the explosive into the well, it has been impossible for the operator to know the descent conditions as actually taking place. Consequently, many premature explosions are caused through loss of the torpedo shell, frictional engagement of the shell with the walls of the well, too rapid descent of the shell, and sudden engagement of the shell with the bottom of the well brought about by mistakes in calculating the depth at which the explosive charge is to be placed.

It has also been impossible to accurately determine the amount of fluid or other stemming in the well in order that the correct amount of additional fluid may be injected into the well to confine the forces of the explosion to the strata 2 and prevent damage to the well casing 3.

Other causes which might result in complete loss of the well are failure to submerge gas bearing strata with fluid, or other stemming, sudden jars and jolts due to failure of the lowering mechanism, and sudden binding and release of the shells engaging obstructions in the well.

As above pointed out, it is the purpose of the present invention to provide a lowering mechanism wherein the descent conditions are visibly indicated so that the operator can control the descent of the explosive according to conditions in the well. He can also determine the amount and kinds of fluid through which the explosive charge is being lowered, thereby preventing many of the hazards incidental to the shooting operation of a well.

Other jobs which may be encountered are to set explosive charges in casings, to sever portions thereof that have become wedged in the well as in the salvaging of tubings and well casings from abandoned wells, releasing tools and many other operations requiring the accurate placement of explosive charges in the form of squibs, bombs, and the like.

In order to provide ready transport of the mechanism from one well to another, as well as to provide power for placement operations, the mechanism is mounted on a motor driven vehicle 11 and contained in a housing 12 carried at the rear of the vehicle in close proximity to the rear wheels thereof.

Figure 2:
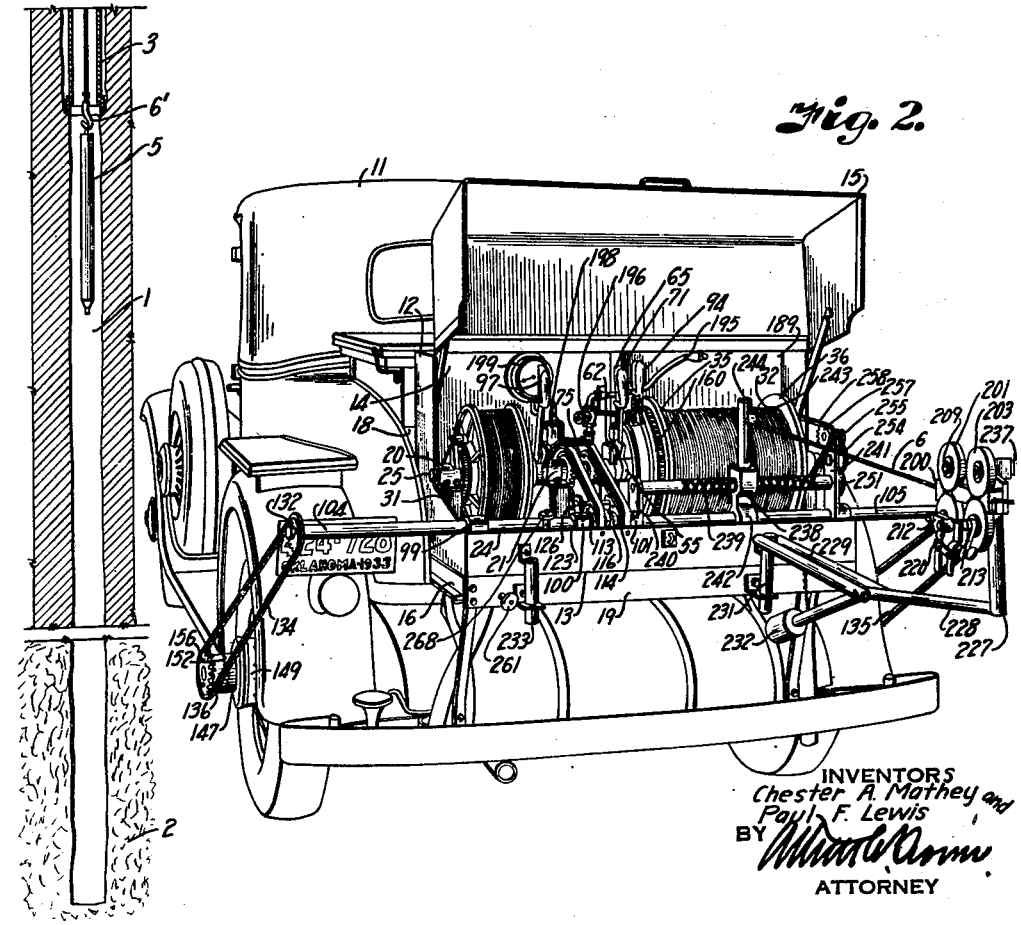
Fig. 2 is an enlarged detail perspective view of the reeling and controlling mechanism, as mounted on a motor driven vehicle, whereby the apparatus is readily transported from one well to another.

The housing 12 includes a base section 13 having an upwardly extending rear portion 14 to which is hinged a cover section 15 for exposing the operating mechanism, as clearly shown in Fig. 2, when it is to be placed in use. The base portion 13 of the housing is mounted on longitudinal sills 16 and 17 supported in the rear compartment 18 of the vehicle and having their rear ends projecting therefrom and connected by a cross bar 19.

Figure 3:
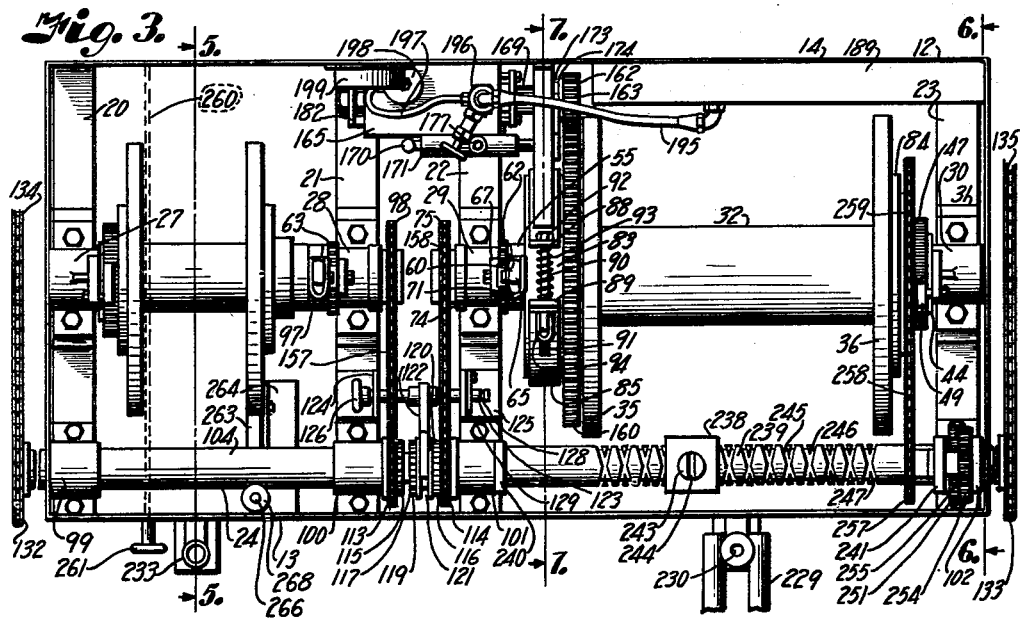
Fig. 3 is a plan view of the apparatus.

Carried in the bottom section 13 of the housing are spaced cross members 20, 21, 22 and 23 respectively forming supports for a power shaft 24 and a pair of reel shafts 25 and 26 extending in parallel relation with the power shaft, as best illustrated in Fig. 3.

The reel shafts have their ends rotatably mounted in bearings 27, 28, 29 and 30 respectively supported on brackets 31 forming a part of the respective cross members at a point substantially midway of their length.

The shaft 26 forms a rotatable support for a torpedo reel 32 on which is coiled the cable 6 for lowering the explosive charge into a well. The torpedo reel 32 includes a drum threadedly engaging hubs 33 and 34 on end disks 35 and 36 which are freely mounted on the shaft and adapted to be selectively connected therewith through clutch mechanism now to be described.

Mounted on the shaft 26 between the bearings 29 and 30 and the adjacent disks 35 and 36 are clutch members 37 and 38. The clutch members include circular plates 39 arranged to engage the outer faces of the reel disks and having threaded hubs 40 provided with spline grooves 41 to engage keys 42 on the shaft to fix the disks in driving relation therewith. In order to increase frictional contact with the inner face of the clutch members with the outer face of the disks, they are provided with a lining material 43.

Figure 4:
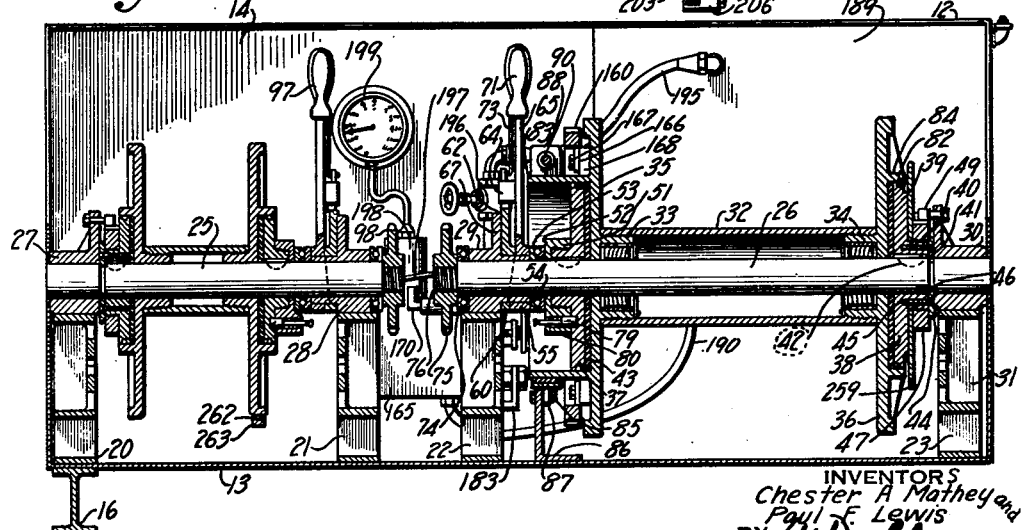
Fig. 4 is a vertical longitudinal sectional view through the reels, particularly illustrating the clutch mechanism for operably connecting the reels with their driving shafts.

The clutch member 38 is rigidly retained against longitudinal movement on the shaft by a sectional ring 44 fixed to the hub thereof by fastening devices 45 extending through openings in the ring and into threaded sockets in the hub, the inner periphery of the ring being mounted in an annular groove 46 formed in the shaft adjacent the inner side of the bearing 30, as shown in Fig. 4.

Threadedly mounted on the hub of the clutch member 38 is a ratchet ring 47 having peripheral teeth 48 adapted to be engaged by a pawl 49 pivotally mounted on a lug 50 extending upwardly from the bearing 30 for selectively preventing rotation of the torpedo reel, as later described.

The other clutch member 37 is slidably mounted on the shaft to be moved into and out of engagement with the clutch face on the disk 35 and to shift the reel so that the clutch face on the disk 36 engages the clutch face of the member 38, the clutch member being actuated by means of a clutch lever actuating mechanism now to be described.

Threaded on the hub of the clutch member 37 is an adjusting nut 51 having an outer face 52 engaging a thrust bearing 53 mounted on the shaft 26 and engaging the flat face 54 of a collar 55 having cam portions 56 and 57 adapted to engage similar cam portions 58 and 59 on a collar 60. The collar 60 is sleeved on a tubular extension 61 projecting from the side of the bearing 29 which also mounts the collar 55. Extending from the periphery of the collar 59 is a ratchet segment 62 having teeth 63 adapted to be engaged by the pawl 64 of an operating lever 65 forming a part of the collar 55. The collar 60 is attached to the bearing 28 by a screw 66 extending through the ratchet segment 62 and into a lug 67 projecting upwardly from the periphery of the bearing, as best illustrated in Fig. 8. The pawl 64 is slidably mounted in a guide loop 68 carried on the lever 65 and is normally retained in engagement with the teeth of the ratchet segment by a spring 69 having one end fixed to the pawl and its opposite end connected with a lateral extension 70 on the lower end of the lever.

The pawl is moved to release position by a hand grinp 71 pivoted on the upper end of the lever, as at 72, and connected to the pawl by a link 73.

It is thus apparent that when the lever is rocked in the direction of the arrow, Fig. 8, the cam portions 56 and 57 of the collar 55 will slide over the complementary cam portions 58 and 59 of the collar 60 to cause lateral shifting of the collar 55 and bearing 53, thereby moving the clutch member 37 into clutch engagement with the clutch face on the reel disk 35 and the clutch face on the reel disk 36 into clutching engagement with the clutch member 38 to effect rotation of the reel by its shaft 26. The inner end of the reel shaft projects through the bearing 28 and carries an anti-friction thrust bearing 74 which is retained thereon by a driving sprocket 75 mounted on the reduced threaded extension 76 of the shaft.

In order to adjust movement of the clutch members upon actuation of the hand lever, the adjusting nut 51 may be manipulated on the hub to vary relative spacing between the bearing 29 and the nut 51. After adjustment, the nut is retained in fixed position by a spring pressed plunger 79 slidably mounted in an extension 80 on the adjusting nut and engageable in one of a series of openings 81 formed in the face of the clutch member 37, as best illustrated in Fig. 8.

The clutch members are preferably provided with lubricant through the bearings mounting the reel and the lubricant is retained by a packing ring 82 carried in the periphery of the clutch members and engaging the inner face of annular flanges 83 and 84 projecting outwardly from the faces of the reel disks.

The flange 83 is preferably of sufficient width to form a brake drum for mounting a brake band 85 that is pivoted on a bracket 86 carried by the floor 13 of the housing by means of a screw extending through an ear 87 on the band and into the bracket 86. The ends of the band terminate in lateral ears 88 and 89 carrying a draw bolt 90 having a head 91 engaging the ear 89 and a nut 92 engaging the ear 88. The ends of the band are normally spread apart by a coil spring 93 sleeved on the draw bolt and having its ends engaging the respective ears so that the brake is normally retained in released condition.

In order to apply the brake band, the head 91 carries a lever 94 adapted to engage against the ear 89 to compress the spring 93 and to contract the band about the periphery of the brake drum. The lever 94 may be retained in braking condition by a pawl 95 carried thereby and releasably engaging rack teeth 96 formed on the head 91 of the draw bolt, as best shown in Fig. 7.

With the exception of the brake drum and size, the squib reel is of substantially the same construction as the torpedo reel, so that the parts thereof need not be described in detail, it being suffice to say that the squib reel is operable by a clutch lever 97 similar to the clutch lever 65 and the shaft 25 thereof is actuated by a sprocket 98 similar to the sprocket 75 on the shaft of the torpedo reel previously described.

In order to drive the reels for winding the cables thereon, we provide a driving mechanism operable by the motor of the vehicle, as now to be described.

Carried on the rear ends of the cross members 20 to 23, inclusive, are bearings 99, 100, 101 and 102 for rotatably mounting the power shaft 24 preferably including spaced sections 104 and 105 having their inner ends connected by a coupling rod 106, the rod 106 having threaded ends 107 and 108 engaging in threaded sockets 109 and 110 formed in the ends of the shaft sections, as best illustrated in Fig. 11.

Rotatably mounted in the bearings 100 and 101 and on the coupling rod 106 are sleeves 111 and 112, each carrying sprocket wheels 113 and 114, respectively, which are provided with clutch faces 115 and 116 that are adapted to be engaged by a clutch member 117. The clutch member 117 is slidably keyed to the rod 106 by a spline 118, the clutch member being provided with clutch faces 119 and 120 for selectively engaging either one of the clutch faces 115 or 116, whereby either one or the other of the sprockets may be actuated, depending upon which one of the sprockets is engaged by the clutch member.

In order to move the clutch member to and from the respective sprockets, the clutch member is provided with an annular groove 121 for mounting an actuating yoke 122 that is fixed to a rod 123 reciprocably mounted in lugs 124 and 125 carried by the cross members 21 and 22, respectively.

The ends of the rod 123 project through the lugs and the end adjacent the lug 124 carries a head 126 by which the rod may be reciprocated to move the clutch member. The opposite end of the rod projects through the lug 125 and is provided with a pair of annular grooves 127 and 128 adapted to be selectively engaged by a rocking lever 129 that is pivoted on a bolt 130 carried by the lug 125 and has a notch 131 adapted to engage with the grooves 127 and 128 depending upon which one of the sprockets is engaged by the clutch.

The outer ends of the shaft sections project beyond the bearings 99 and 102, through the end walls of the housing, and carry sprockets 132 and 133 that are driven by chains 134 and 135 connected with power take off mechanisms 136 mounted on the ends of each of the rear axles of the vehicle, as now to be described.

One of the power take off mechanisms is illustrated in Figs. 19, 20 and 21 and is shown as including an axle extension 137 threadedly mounted on the end 138 of a rear axle 139. Fixed to the tapered portion 140 of the axle is a bearing sleeve 141 that is retained by the ends of the axle extension 137 engaging against an internal shoulder 142 formed in the bearing sleeve.

Rotatably mounted on the bearing sleeve are anti-friction bearing sets 143 and 144 which are retained against lateral movement by a collar 145 provided on the bearing sleeve and by a washer 146 fixed to the inner end of the bearing sleeve.

Rotatably mounted on the bearing sets is a wheel hub 147 having an annular flange 148 for mounting the wheel hub housing 149 and the brake drum 150, as in conventional automotive practice. The outer end of the wheel hub carries an inwardly extending flange 151 engageable with the collar 145 of the bearing sleeve and is provided with clutch teeth 151' adapted to be engaged by the teeth 152' on the clutch collar 152 that is slidably keyed on the bearing extension by splines 153. The clutch collar is actuated on the bearing sleeve by a nut 154 threaded on the bearing sleeve and rotatably connected with the clutch collar by means of a ring 155 fixed to the nut and engaged in an annular groove 155' in the collar, the nut being adapted for rotation by a suitable spanner wrench, not shown, engageable in sockets 154' in the periphery of the nut.

Fixed to the outer end of the bearing sleeve of each power take off is a sprocket 156 aligning with the sprockets 128 and 129 on the power shaft for operating the chains 134 and 135.

It is apparent that when the clutch collar 152 is moved into engagement with the teeth 151' on the wheel hub the wheel hub will be effective in driving the wheel of the vehicle but when the clutch collar is moved to disengaged position, the bearing sleeve is free to rotate within the wheel hub without actuating the wheel of the vehicle. Consequently, when the chains 134 and 135 are connected with the sprockets 156, the rear axles 139 of the vehicle may be utilized for operating the power shaft to effect operation of either one of the reels which are connected with the power shaft by chains 157 and 158 operating over sprockets 113 and 98 and over the sprockets 114 and 75, respectively.

When the clutch collar 152 is out of engagement with the wheel hub, the nut 154 is locked against rotation by a spring pressed plunger 159 carried by the sprocket and adapted to engage in a socket 159' that is formed in the nut.

While the brake band above described may be effective in controlling rotation of the torpedo reel, or the clutch disks may be employed as a brake, in accordance with previous practice, such braking means are not to be depended upon to retard descent of the explosive charge that is being lowered into the well for the reason that increased acceleration of the explosive charge is likely to burn out their frictional surfaces to such an extent that slipping and jerking action thereof will effect loss of the explosive charge which more than likely would result in premature explosion and loss of the well.

We therefore provide a more positive means for automatically controlling velocity of the explosive charge whereby it may be selectively lowered at constant velocity, which velocity is reduced as the charge approaches the fluid level, reduction collar liner and bottom of the well.

The original braking equipment is therefore simply used for emergency purposes. We also utilize the control mechanism for indicating the descent conditions of the charge from the time that the charge is lowered into the well until it reaches its proper position in the barrel or at the bottom of the well, as now to be described.

Fixed to the outer face of the disk 35 and encircling the brake drum 83 is a ring gear 160 having teeth 161 engaging the teeth 162 of a pinion 163 mounted on the actuating shaft 164 of a pump 165. The ring gear 160 is provided with inwardly extending lugs 166 that are secured by bolts 167 to aligning lugs 168 on the outer face of the disk 35 of the torpedo reel, as best illustrated in Fig. 8.

The pinion 163 is best illustrated in Fig. 9 and is shown as being slidably mounted on a splined head 169 of the shaft 164 so that it may be moved to and from engagement with the ring gear upon reciprocation of a rod 170 that is slidably mounted in a bearing sleeve 171 carried by the pump 165, the shaft 170 carrying a yoke 172 engaging a groove 173 in the hub 174 of the pinion gear 163.

The opposite end of the rod 170 carries a lateral extension or handle 175 by which the rod may be shifted in the bearing to move the pinion gear to and from engagement with the ring gear, the pinion gear being retained in either selected position by a pawl latch 176 slidably mounted in the lug 177 on the sleeve 171 and engaging in one of a pair of grooves 178 and 179, the pawl latch being normally urged into engagement with the rod by a spring 180 having one end engaging against the pawl and its opposite end against a plug 181 threaded in the lug 177.

The pump housing is fixed to the inner ends of the cross members 21 and 22 by brackets 182 and 183 and includes a substantially rectangular block having intercommunicating cylindrical chambers 184 and 185 therein in which are rotatably mounted intermeshing pump gears 186 and 187, the gear 186 being keyed to the shaft 164 and the gear 187 keyed to a shaft 188 rotatably mounted in the pump housing, as in ordinary gear pump construction.

Rotation of the gears 186 and 187 draws fluid from a supply tank 189 through a conduit 190 connected with the tank and an inlet channel 191 formed in the pump housing and discharges the fluid under pressure through an exhaust port 192 into a discharge conduit 194 for return to the supply tank through a conduit 195, the flow through the conduit 194 being selectively throttled by a regulating valve 196 to vary the rotational speed of the gears 186 and 187.

Also connected to the conduit 194 by a branch conduit 197 and responsive to the fluid pressure therein, is a surge chamber 198.

Connected with the surge chamber is a pressure gage 199 for indicating the discharge pressures of the pump and which is positioned so that the operator may observe the pressures as the explosive charge is being lowered into the well, as hereinafter described.

With the brake mechanism thus far described, it is apparent that closing the valve 196 will stop operation of the pump gears 186 and 187 due to incompressibility of the fluid. Consequently, stopping of the pump will also stop unreeling action of the reel providing the pinion gear 163 is in meshing relation with the ring gear 160 on the reel.

When the valve 196 is in wide open condition, the fluid has free egress from the pump and the reel is free to rotate at its maximum speed and maximum descent velocity of the explosive charge.

By moving the valve to intermediate positions, it is apparent that the speed of the reel may be varied at will from maximum to zero rotational speeds and thereby control velocity at which the explosive charge descends.

It is also apparent that any retardation in velocity of the explosive charge below that set by the valve 196 will cause reduction in the rotational speed of the reel and corresponding decrease in the rotational speed of the pump due to the direct connection of the reel with the pump through the gears 160 and 163. Reduction in the speed of the pump causes a reduction in pressure on the discharge side of the pump which will be visibly indicated to the operator on the gage 199.

Reduction in the pressure on the gage will show to the operator that the descent conditions of the explosive charge have changed and that the explosive charge is being retarded by the fluid content of the well or perhaps by frictional engagement of the shell on the wall of the well.

As the operator becomes experienced with the conditions encountered, the changes in pressure, as indicated by the gage, will indicate to him the exact conditions in the well, for example, certain pressures will indicate that the explosive charge is moving through water, slightly different pressures that the explosive charge is moving through a fluid of different gravity, such as oil.

Other pressures will indicate that the explosive charge is dragging upon and being retarded by the walls of the well and other pressures that the explosive charge is moving freely through the well casing, while still other fluctuating pressures will indicate to the operator when the explosive charge is passing through a gas containing stratum.

While the hydraulic mechanism just described will indicate the kind of fluid through which the charge is descending, and the time it takes to descend through the fluid by noting the interval between changes in gage pressures, it will not show the depth of the respective fluids from the surface of the well and we provide a measure meter operable upon the line for indicating the position of the explosive charge relatively to the top of the well, so that by observing the measure meter, together with the pressure gage 199, the depth at which the explosive charge enters the respective fluids may be noted.

This is a most important feature of the present invention in combination with the hydraulic brake and its recording gage because it provides safety in placing the explosive charges and provides positive information as to position of the torpedo shell relatively to conditions in the well.

The measure meter is best illustrated in Figs. 2, 3, 5, 6, 7, 17 and 18 and is shown as including a frame 200 carrying upper and lower pairs of wheels 201, 202, 203 and 204 adapted to operate directly upon the cable 6 as it is being paid from the reel.

The frame 200 comprises a plate portion 205 having spaced laterally extending lugs 206 provided with downwardly opening slots 207 for passing the line. The ends of the lugs are cut away in arcuate curves 208 to accommodate the periphery of the wheels. Carried by the plate portion 205 directly above the spacings between the lugs are stub shafts 209 and 210 for mounting the wheels 201 and 203 with their axes in fixed relation to the frame. The wheels 202 and 204, however, are movable to and from engagement with the cable, as now to be described.

Pivotally supported on the frame 200 on a pin 211 are bell cranks 212 and 213 having arms 213' carrying stub shafts 214 and 215 for the wheels 202 and 204. The other arms 215' of the bell cranks have facing sockets 216 and 217 for mounting the ends of a coil spring 218 to swing the bell crank outwardly, thereby urging the wheels into engagement with the cable, the tension of the spring being regulated by a thumb screw 219 which is threaded into the end of the socket 217 and has its end engaging a follower of the spring 218 to vary the pressure of the wheels on the cable. The wheels 202 and 204 may be locked from engagement with the cable by a latch 220 pivoted on the bell crank 213 and having a notch 221 engageable with a pin 222 on the bell crank 212 whereby the depending arms of the bell crank may be moved toward each other against tension of the spring and latched to prevent the wheels 202 and 204 from engaging the cable to facilitate threading thereof between the pairs of wheels.

To mount the measure meter, the frame 200 has a stud 223 extending from the rear side thereof which is rockingly mounted in a horizontal bearing 225 on the upper end of a vertical post 226, the post 226 being rotatably mounted in a vertical sleeve 227 carried on the end of a lever arm 228 that is pivotally mounted on a swinging bracket 229 having a pintle 230 that is rotatably mounted in a socket 231 carried on the cross bar 19 previously described. It is thus obvious that the measure meter is free to rock on horizontal and vertical pivots and at varying angles relatively to the reel due to the mounting of the lever 228.

The weight of the measure meter is counterbalanced on the bracket 229 by a weight 232 fixed to the free end of the lever arm 228. A similar socket 233 may be mounted on the bar 19 adjacent the squib reel so that the measure meter may be removed from the socket 231 and applied to the socket 233 for measuring the amount of wire removed from the squib reel.

Fixed in driving relation with the wheels 201 and 203 are gears 234 and 235 each meshing with a common gear 236 on a counter 237 carried by the frame 200 and which registers the number of feet of cable paid from the reel.

In order to control unreeling action of the cable and to effect reeling of the cable in layers on the torpedo reel, we provide a guide member 238 that is slidably mounted on a shaft 239 carried in brackets 240 and 241 forming upward extensions of the bearings 101 and 102, as best shown in Fig. 2.

The member 238 also carries a depending portion 242 sleeved in guided relation with the section 105 of the power shaft to retain it in perpendicular position. Also carried by the member 238 is a post 243 having a vertical slot 244 for passing the cable.

In order to effect movement of the guide member across the torpedo reel to effect layer winding of the cable the shaft 239 carries a pair of right and left spiral cam grooves 245 and 246 having interconnecting portions 247 at the ends thereof, as shown in Fig. 15, whereby a follower 248 that is pivotally mounted on a pin 249 in a socket 250 in the guide member is free to move from one groove to the other, as the guide member approaches the respective ends of the reel, the shaft 239 being rotated in timed relation with the reel by a gear 251 meshing with a smaller pinion gear 252 on a stub shaft 253 which carries a gear 254 fixed in driving relation with the small pinion gear and meshing with a pinion gear 255 on a stub shaft 256 also carried by the bracket 241. The stub shaft 256 carries a sprocket 257 which is operated by a chain 258 on a sprocket 259 fixed to the torpedo reel at a point between the clutch member 38 and the ratchet gear 47, as best shown in Fig. 4.

It is thus apparent that the guide member is moved to and fro across the front of the reel at speeds in direct proportion to the rotational speeds of the reel so that the cable is wound and unwound in layers.

The motor of the vehicle may be controlled at a point adjacent the reel controls by a rod 260 that is connected to the engine throttle (not shown) and extends along rearwardly of the frame of the vehicle and carries a knob 261 whereby the rod may be reciprocated to retard or accelerate the speed of the engine to vary the winding speed of the reels.

In order to control rotation of the squib reel, we provide a brake shoe 262 which is mounted on a lever 263 that is carried on a bracket 264 located in the housing in line with the inner disk of the squib reel, as clearly shown in Fig. 5.

The braking end of the lever is normally retained from engagement with the reel by a coil spring 265 that is sleeved over a threaded rod 266 extending through the free end of the brake lever and having its lower end mounted in an ear 267 extending from the bracket 264.

To move the brake into engagement with the periphery of the reel disk, the upper threaded portion of the rod is provided with a hand nut 268 which is adapted to rock the lever against tension of the coil spring 265 and retain the shoe in braking position.

In using an apparatus constructed and assembled as described, and assuming that an explosive charge is to be placed in the bottom of the well for shooting the producing horizon, the vehicle 14 carrying the unreeling unit as above described is backed to a point adjacent the derrick 4 so that the torpedo reel is in position in line with the center of the well hole.

The pulley 7 is then adjusted so that the periphery of the pulley is in tangential alignment with the center of the well.

The free end of the cable 6 is passed through the slot 244 of the guide member 243, threaded between the wheels of the measure meter, and over the pulley 7. The reel brake is then set and the pawl 49 moved into engagement with the ratchet wheel 47 to prevent rotation of the reel.

The sprockets 132 are connected with the sprockets 156 of the power take off mechanisms, and the clutches 152 thereof are moved out of engagement with the clutch face of the wheel hubs so that the bearing sleeves are free to rotate within the wheel hubs without driving the wheels of the vehicle when operating the chains. The clutch 117, however, is retained in neutral position between the clutch faces of the sprockets 113 and 114 so that neither sprocket is effective in driving the reels.

It is best practice to prospect the well hole by running a dummy shell into the well and to record the depths at which variations in descent velocity occur in order that the well conditions may be known to the operator prior to placing a torpedo shell. A dummy shell having the same relative size, shape and weight as a torpedo shell is tied to the cable 6 and suspended over the well hole. The rod 170 is then actuated to move the gear 163 into meshing relation with the ring gear 160 on the torpedo reel to operably connect the torpedo reel with the pump which controls and regulates rotational speed of the reel and limits the descent of the charge.

The brake lever 94 is then actuated to release the brake band from engagement with the brake drum on the reel and the pawl lifted to permit rotation of the reel and allow descent of the dummy shell into the well under the force of gravity.

The rate of descent, however, will be under the braking action of the pump 165, so that the cable can unwind only as fast as the reel is permitted to rotate, the rotational speed of the pump being regulated by the throttle valve 196.

By observing the gage 199, the rate of descent of the dummy shell is noted and maintained at a desired speed by closing or opening the throttle valve.

As the dummy shell descends into the well, it may encounter fluid and other obstructions to affect its rate of descent, which is indicated by fluctuations of the gage 199 in such a manner that the operator is informed as to the nature of the body encountered.

During descent of the dummy shell, the measure meter is measuring the torpedo line paid into the well so that by observing the register 237, the operator is informed as to the depths at which the descent variations occur and the total depth of the well when the dummy reaches the bottom thereof.

After the recordings have been made, the dummy shell is removed from the well.

This is accomplished by moving the clutch 117 to engage the clutch face of the sprocket wheel 114 to effect rotation of the torpedo reel shaft 26. The clutch lever 65 is then actuated to cause engagement of the clutch disk with the clutch faces of the torpedo reel to effect reverse rotation thereof and winding of the cable 6 on the reel.

As the cable is wound on the reel, the cam shaft 239 will be rotated to effect reciprocation of the guide member 238 back and forth across the width of the reel and effect even winding of the cable thereon.

The first torpedo shell is then secured to the cable by a torpedo hook 6' as in conventional practice, filled with nitroglycerin, and lowered into the well in the same manner as the dummy previously described. During the descent, the descent velocity of the torpedo is controlled by the operator in conformity to the recordings previously obtained so that the torpedo may be lowered at speeds best suited to the conditions within the well. As the torpedo nears the point of placement, the speed thereof is retarded and controlled to prevent sudden engagement thereof with the bottom of the well.

When the line slacks sufficiently, the torpedo hook automatically disengages from the shell as in conventional practice. It sometimes happens that insufficient slack has been applied to the line to effect release of the shell, but to assure that the shell is released the cable is raised some distance above the point at which the shell is placed, and the clutch lever 65 is actuated to effect release of the reel and reverse rotation thereof under weight of the cable in the well.

The operator then observes the reading on the gage 199 and if it indicates the same pressures as those registered at the time the shell was moving through the same portion of the well, it will show to him that the shell has not been released, but is still depending from the cable.

If this is the case, the shell will be returned to the bottom of the well and another attempt made to release it.

If, when the operations are repeated, a different registration is recorded on the gage 199, it will show that the shell has been released and the cable is ready to be removed from the hole preparatory to lowering succeeding shells and explosion of the charge by conventional methods.

The clutch lever is then actuated to reengage the reel for rewinding the cable thereon and completing the operation.

After the cable is removed, the required amount of fluid, or other stemming, is introduced into the well.

If the job is to set a squib in the casing, tubing or drill pipe, or adjacent tools that are to be sidetracked, the cable on the squib reel is run over the pulley 7 and the squib is lowered into the well and stopped by the brake 262 when it reaches the position at which it is to be set.

After the squib has exploded, the remaining portion of the wire may be removed from the well by actuating the clutch lever 97 to cause the clutch disks for the squib reel to engage the clutch faces of the reel.

When the clutch 117 has been moved into engagement with the clutch face on the sprocket wheel 113, the squib reel will be rotated in reverse direction to rewind the wire.

When the squib reel is in use, the measure meter may be supported by the socket 233 to register the amount of wire paid into the well as described in the instance of the torpedo reel.

From the foregoing, it is apparent that we have provided a cable reeling apparatus which may be conveniently transported from one location to another and which is actuated to control descent of an explosive charge in direct conformity to the actual conditions through which the explosive charge is moving, thereby eliminating many of the hazards common to setting high explosive charges.

What we claim and desire to secure by Letters Patent is:

1. In an apparatus of the character described, a reel, a cable wound on the reel for lowering an explosive charge into a well, hydraulic braking means connected with the reel, an indicator actuated through said braking means for indicating fluctuation in rate of descent of the explosive charge in the well, and a measure meter operated by the cable to register depth of the explosive charge in the well in coordination with said fluctuations whereby the depth and velocity readings may be determined simultaneously.

2. In an apparatus of the character described, a support, a reel on the support, a cable wound on the reel for lowering an explosive charge into a well, an indicator for indicating fluctuation in rate of descent of the explosive charge in the well, means operably connecting the indicator with the reel, a measure meter engaging the cable to register depth of the explosive charge in the well simultaneously with the fluctuations, and means for universally mounting the measure meter on the support for movement with changing angle of the cable relatively to the reel.

3. In combination with a motor vehicle, a reel carried by the vehicle, a cable wound on the reel for lowering an explosive charge into a well, hydraulic means on the vehicle controlling unwinding of the cable from the reel to regulate descent rate of the explosive charge, means connected with said hydraulic means for indicating descent variation of the explosive charge in the well, a measure meter engaging the cable to register pay of the cable from the reel whereby the depths and velocity readings may be determined simultaneously, and means for universally mounting the measure meter on the vehicle to follow angular pay of the cable from the reel.

4. The method of setting an explosive charge in a well including lowering a dummy shell into the well, recording variations in descent velocity of the dummy shell during the time it is being lowered into the well, simultaneously recording the depths at which said variations occur, removing the dummy shell from the well, lowering an explosive charge into the well, and regulating descent of the explosive charge in conformity with said recordings.

5. The method of setting an explosive charge in a well including lowering a dummy shell into the well, recording variations in descent velocity of the dummy shell, simultaneously recording depths at which said variations occur, removing the dummy shell from the well, lowering an explosive charge into the well, and regulating descent velocity of the explosive charge at the points at which said variations occur as indicated by said recordings.

6. The method of setting an explosive charge in a well including lowering a dummy shell into the well, limiting the descent velocity of the shell to a predetermined maximum, recording variation in velocity from said predetermined maximum velocity, simultaneously recording depths at which said variations occur, removing the dummy shell from the well, lowering an explosive charge into the well, maintaining the same maximum descent velocity as that of the dummy shell, and regulating the descent velocity of the explosive charge in direct conformity with said recordings.

CHESTER A. MATHEY.
PAUL F. LEWIS.